United States Patent
Galimberti et al.

(10) Patent No.: US 9,228,031 B2
(45) Date of Patent: Jan. 5, 2016

(54) PROCESS FOR REDUCING UNSTABLE END-GROUPS IN FLUORINATED POLYMERS

(71) Applicant: SOLVAY SPECIALTY POLYMERS ITALY S.P.A., Bollate, MI (US)

(72) Inventors: Marco Galimberti, Bollate (IT); Stefano Millefanti, Carbonate (IT); Vito Tortelli, Milano (IT)

(73) Assignee: SOLVAY SPECIALTY POLYMERS ITALY S.P.A., Bollate (Milano) (IT)

( * ) Notice: Subject to any disclaimer, the term of this patent is extended or adjusted under 35 U.S.C. 154(b) by 53 days.

(21) Appl. No.: 14/359,825

(22) PCT Filed: Nov. 20, 2012

(86) PCT No.: PCT/EP2012/073037
§ 371 (c)(1),
(2) Date: May 21, 2014

(87) PCT Pub. No.: WO2013/079352
PCT Pub. Date: Jun. 6, 2013

(65) Prior Publication Data
US 2014/0309376 A1    Oct. 16, 2014

(30) Foreign Application Priority Data
Nov. 30, 2011  (EP) .................... 11191272

(51) Int. Cl.
| | | |
|---|---|---|
| *C08F 14/18* | (2006.01) | |
| *C08F 8/22* | (2006.01) | |
| *C08F 14/26* | (2006.01) | |
| *C08F 14/28* | (2006.01) | |
| *C08G 65/323* | (2006.01) | |
| *C08G 65/00* | (2006.01) | |
| *C08G 65/337* | (2006.01) | |
| *C08F 234/02* | (2006.01) | |
| *C08F 216/14* | (2006.01) | |

(52) U.S. Cl.
CPC . *C08F 8/22* (2013.01); *C08F 14/18* (2013.01); *C08F 14/26* (2013.01); *C08F 14/28* (2013.01); *C08G 65/00* (2013.01); *C08G 65/007* (2013.01); *C08G 65/3236* (2013.01); *C08G 65/337* (2013.01); *C08F 234/02* (2013.01); *C08F 2216/1475* (2013.01); *C08F 2800/10* (2013.01); *C08F 2810/40* (2013.01)

(58) Field of Classification Search
None
See application file for complete search history.

(56) References Cited

U.S. PATENT DOCUMENTS

| | | | |
|---|---|---|---|
| 3,242,218 A | | 3/1966 | Miller |
| 3,639,510 A | * | 2/1972 | Paine .................... C08F 279/02 525/244 |
| 3,931,132 A | * | 1/1976 | Low et al. ............... C08F 36/16 525/244 |
| 4,536,266 A | | 8/1985 | Bliefert et al. |
| 4,626,587 A | | 12/1986 | Morgan et al. |
| 4,743,658 A | | 5/1988 | Imbalzano et al. |
| 5,149,744 A | | 9/1992 | Tarancon |
| 6,111,062 A | * | 8/2000 | Shirota et al. ............ C08F 8/22 525/326.2 |
| 2010/0087553 A1 | | 4/2010 | Arcella et al. |

FOREIGN PATENT DOCUMENTS

| | | |
|---|---|---|
| EP | 340739 A2 | 11/1989 |
| EP | 918060 A1 | 5/1999 |
| EP | 1256591 A1 | 11/2002 |
| EP | 1256592 A1 | 11/2002 |
| EP | 1914251 A1 | 4/2008 |
| GB | 1210794 A | 10/1970 |
| GB | 1226566 A | 3/1971 |
| JP | 08283338 A | 10/1996 |

OTHER PUBLICATIONS

Pianca M. et al.,"End groups in fluoropolymers", Journal of Fluorine Chemistry, 1999, vol. 95, p. 71-84—Elsevier Science S.A.

* cited by examiner

*Primary Examiner* — Robert C Boyle

(57) ABSTRACT

A process for reducing the number of unstable end-groups in a fluorinated polymer is disclosed, said process comprising reacting a fluorinated polymer comprising unstable end-groups with fluorine in the presence of at least one (per) haloolefin comprising at least one carbon-carbon double bond and having at least one fluorine or chlorine atom on either one of the carbon atoms of said double bond. The fluorinated polymer may be selected from those polymers comprising recurring units derived from at least one ethylenically unsaturated fluorinated monomer or from fluorinated polyethers.

16 Claims, No Drawings

PROCESS FOR REDUCING UNSTABLE END-GROUPS IN FLUORINATED POLYMERS

This application is a U.S. national stage entry under 35 U.S.C. §371 of International Application No. PCT/EP2012/073037 filed Nov. 20, 2012, which claims priority to European application EP11191272.1 filed Nov. 30, 2011. The entire contents of these applications are explicitly incorporated herein by this reference.

TECHNICAL FIELD

The invention relates to a process for reducing unstable end-groups in fluorinated polymers.

BACKGROUND ART

Fluorinated polymers are known in the art. Fluorinated polymers are generally known for their chemical and thermal stability. Said thermal and chemical stability is however negatively affected by the presence of ionic end-groups in the polymeric chain, for instance —$CH_2OH$, —COF, —COOH type end-groups. For instance, —COF and —COOH type end-groups are known to initiate the so-called "unzipping reaction", wherein starting from these end-groups, the main chain of the fluorinated polymer progressively disaggregates following the reaction scheme sketched here below:

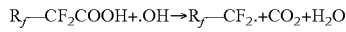

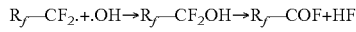

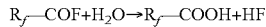

wherein $R_f$ represents the fluorinated polymer chain.

Several methods have been proposed in the past aiming at improving the stability of fluorinated polymers by reduction of the number of unstable end-groups.

GB 1210794 (E.I. DUPONT DE NEMOURS AND COMPANY) Oct. 28, 1970 discloses a process for the stabilization of high molecular weight fluorocarbon polymers in the solid state (as particulate or pre-molding form or as molded articles) by contacting said polymers with a fluorine radical generating compound (e.g. gaseous fluorine) in the absence of oxygen.

U.S. Pat. No. 4,743,658 (E.I. DUPONT DE NEMOURS AND COMPANY) May 10, 1988 discloses a process for the stabilization of tetrafluoroethylene/perfluoroalkylvinylether copolymers by fluorination of the same under the form of pellets by solid/gas reaction with fluorine gas.

These processes however generally require the use of high temperature to obtain the full conversion of the unstable-end groups.

Also it is known in the art a process for the stabilization of amorphous polymers. EP 1256591 A (AUSIMONT S.P.A.) Nov. 13, 2002 and EP 1256592 A (AUSIMONT S.P.A.) Nov. 13, 2002 disclose a process for the stabilization of amorphous perfluorinated polymers, wherein the polymer is first dissolved in a suitable solvent so as to obtain a solution having a concentration of from 0.5 to 15% by weight, and then said solution is submitted to fluorination with elemental fluorine in the presence of UV radiation. Fluoropolymers stabilized according to such method are endowed with a substantial absence of unstable polar end groups, i.e. undetectable by FT-IR spectroscopy.

GB 1226566 (MONTECATINI EDISON SPA) Apr. 4, 1967 discloses a process for the removal of ionic end-groups in perfluorinated polyethers which comprises fluorination of the perfluorinated polyether in a liquid phase with fluorine at a temperature of 100 to 350° C.

It has now been found that the reduction of unstable end-groups can be efficiently performed on a fluorinated polymer under mild reaction conditions and with high conversion of the unstable end-groups by treating said fluorinated polymer with fluorine in the presence of a (per)haloolefin.

DISCLOSURE OF INVENTION

It is thus an object of the present invention to provide a process for reducing the number of unstable end-groups in a fluorinated polymer.

The process of the invention comprises reacting a fluorinated polymer comprising unstable end-groups with fluorine in the presence of at least one (per)haloolefin comprising at least one carbon-carbon double bond and having at least one fluorine or chlorine atom on either one of the carbon atoms of said double bond.

The expression "unstable end-groups" is used to indicate chain end-groups of the following types —$CH_2OH$, —COF, —COOH, —$CONH_2$, —$CONR_2$, —COOR, wherein R indicates a $C_1$-$C_{20}$ alkyl or fluoroalkyl group. Preferably the expression "unstable end-groups" is used to indicate chain end-groups comprising a —C(O)— functional group, thus end-groups selected from the group consisting of —COF, —COOH, —$CONH_2$, —$CONR_2$, —COOR, wherein R is as defined above.

The term "fluorinated" is used herein to refer to compounds (e.g. monomers, polymers, polyethers etc.) wherein at least 95%, 98% and even 99% of hydrogen atoms have been replaced by fluorine atoms and/or halogen atoms. The term includes compounds wherein a small amount of hydrogen atoms of less than 5%, 2% and even 1%, may still be present.

The term "perfluorinated" is used herein to refer to compounds (e.g. monomers, polymers, polyethers etc.) that are free of hydrogen atoms, i.e. wherein at least 99.5% of hydrogen atoms, preferably at least 99.8% of hydrogen atoms have been replaced by fluorine atoms and/or halogen atoms.

The expression "fluorinated polymers" as used in the present specification includes both polymers comprising recurring units deriving from the addition polymerization of at least one ethylenically unsaturated fluorinated monomer as well as fluorinated polyethers.

In one embodiment fluorinated polymers are those comprising recurring units derived from at least one ethylenically unsaturated fluorinated monomer. Typically these fluorinated polymers have a number average molecular weight ($M_n$) of at least 10000, preferably at least 20000. The molecular weight ($M_n$) is generally not higher than 1000000, preferably not higher than 500000 and even more preferably not higher than 250000.

Non limiting examples of suitable ethylenically unsaturated fluorinated monomers are:

$C_2$-$C_8$ perfluoroolefins, such as tetrafluoroethylene, hexafluoropropylene;

chloro- and/or bromo- and/or iodo-$C_2$-$C_6$ fluoroolefins, like chlorotrifluoroethylene;

fluoroalkylvinylethers of formula $CF_2$=$CFOR_{f1}$ in which $R_{f1}$ is a $C_1$-$C_6$ fluoro- or perfluoroalkyl, e.g. —$CF_3$, —$C_2F_5$, —$C_3F_7$;

fluoro-oxyalkylvinylethers of formula $CF_2$=$CFOX_1$, in which $X_1$ is a $C_1$-$C_{12}$ fluoroxyalkyl, or a $C_1$-$C_{12}$ perfluorooxyalkyl having one or more ether groups, like perfluoro-2-propoxy-propyl;

fluoroalkyl-methoxy-vinylethers of formula $CF_2$=$CFOCF_2OR_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ perfluorooxyalkyl having one or more ether groups, like —$C_2F_5$—O—$CF_3$;

functional fluoro-alkylvinylethers of formula $CF_2$=$CFOY_0$, in which $Y_0$ is a $C_1$-$C_{12}$ fluoroalkyl or perfluoroalkyl, or a $C_1$-$C_{12}$ fluorooxyalkyl, or a $C_1$-$C_{12}$ perfluorooxyalkyl, said $Y_0$ group having one or more ether groups and $Y_0$ comprising a carboxylic or sulfonic acid group, in its acid, acid halide or salt form;

fluorodioxoles, of formula (I):

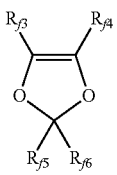

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Notable examples of fluorinated polymers that may advantageously be stabilized with the inventive process include tetrafluoroethylene copolymers which comprise, in addition to recurring units deriving from tetrafluoroethylene, recurring units deriving from of at least one other monomer selected from the group consisting of hexafluoropropylene and/or perfluoro(alkyl vinyl ether) in which the linear or branched perfluoroalkyl group contains 1 to 5 carbon atoms. Preferred perfluoro(alkyl vinyl ether)monomers are those in which the perfluoroalkyl group contains 1, 2, 3 or 4 carbon atoms. Mention may be made in particular of tetrafluorethylene/hexafluoropropylene copolymers, tetrafluoroethylene/perfluoro(alkyl vinyl ether) copolymers, tetrafluoroethylene/hexafluoropropylene/perfluoro(alkyl vinyl ether) copolymers wherein the perfluoro(alkyl vinyl ether) is selected from perfluoro(methyl vinyl ether) and/or perfluoro(propyl vinyl ether); tetrafluorethylene/perfluoro(methyl vinyl ether)/perfluoro(alkyl vinyl ether) copolymers wherein the perfluoroalkyl group of the perfluoro(alkyl vinyl ether) has at least 2 carbon atoms.

Another class of fluorinated polymers that may advantageously be treated according to the inventive process includes copolymers comprising recurring units deriving from tetrafluoroethylene or chlorotrifluoroethylene and recurring units deriving from fluorodioxoles of formula (I) above. Preferred fluorodioxoles are selected from 2,2-bis(trifluoromethyl)-4,5-difluoro-1,3-dioxole and 2,2,4-trifluoro-5-trifluoromethoxy-1,3-dioxole.

Still another class of fluorinated polymers comprises polymers comprising recurring units deriving from tetrafluoroethylene and/or chlorotrifluoroethylene and recurring units deriving from at least one functional monomer of formula $CF_2$=CF—O—$(CF_2CF(CF_3)O)_m$—$(CF_2)_n SO_2 F$ and its acid or salt form wherein m is an integer equal to 0 or 1, n is an integer from 0 to 10, preferably from 1 to 4.

In another embodiment of the process the fluorinated polymer is a fluorinated polyether. Fluorinated polyethers generally have a number average molecular weight ($M_n$) of at least 400, preferably of at least 450. The molecular weight ($M_n$) typically is not higher than 15000, preferably not higher than 10000.

Non-limiting examples of suitable fluorinated polyethers include those comprising one or more recurring units chosen among the group consisting of:
—CFXO—, wherein X is —F or —$CF_3$;
—$CF_2$CFXO—, wherein X is —F or —$CF_3$;
—CFX$CF_2$O—, wherein X is —F or —$CF_3$;
—$CF_2CF_2CF_2$O—;
—$CF_2CF_2CF_2CF_2$O—;
—$(CF_2)_k$—CFZ—O—, wherein k is an integer from 0 to 3 and Z is a group of general formula —$OR_FT_3$, wherein $R_F$ is a fluoropolyoxyalkylene chain comprising a number of recurring units from 0 to 10, said recurring units being chosen among the following: —CFXO—, —$CF_2$CFXO—, —$CF_2CF_2CF_2$O—, —$CF_2CF_2CF_2CF_2$O—, wherein each of X is independently —F or —$CF_3$, and $T_3$ is a $C_1$-$C_5$ perfluoroalkyl group, and mixtures thereof.

Notable examples of fluorinated polyethers that may conveniently be subjected to the inventive process are those comprising units selected from the group consisting of:
—$(CF_2O)_a$—$(CF_2CF_2O)_b$—$(CF_2$—$(CF_2)_d$—$CF_2O)_c$—, wherein a, b and c are integers up to 100, preferably up to 50, and d is independently at each occurrence an integer equal to 1 or 2, a≥0, b≥0, c≥0 and a+b>0; preferably, each of a and b are >0 and b/a is comprised between 0.1 and 10;
—$(C_3F_6O)_e$—$(CF_2CF_2O)_b$—$(CFXO)_g$—, wherein X is, at each occurrence, independently selected among —F and —$CF_3$; b, e and g are integers up to 100, e>0, b≥0, g≥0; preferably, b and g>0, e/b is comprised between 0.2 and 5.0 and (e+b)/g is comprised between 5 and 50;
—$(C_3F_6O)_e$—$(CFXO)_g$—, wherein X is, at each occurrence, independently selected among —F and —$CF_3$; e and g are integers up to 100, e>0, g≥0, preferably g>0, e/g being comprised between 5 and 50.

The fluorinated polymer may be a solid or a liquid. When the fluorinated polymer is a solid the process may be carried out by directly contacting fluorine and the per(halo)olefin with the polymer in solid form. Preferably the polymer is in the form of granules or pellets to increase the area of the polymer surface directly in contact with fluorine.

Alternatively, the process may be carried out in the liquid phase by suspending, dispersing or dissolving the fluorinated polymer in a suitable solvent. The term "dissolved" is intended to denote a "true" solution of the fluorinated polymer. The wording "dispersed form" is on the other hand intended to denote a colloidal suspension of the fluorinated polymer, whereby particles of the fluorinated polymer of average particle size of generally less than 500 nm are stably suspended with no settlement phenomena when left in unperturbed state. In case of dispersed form, the fluorinated polymer advantageously possesses an average particle size of 1 to 500 nm, preferably of 1 to 250 nm, even more preferably from 1 to 100 nm. The term "suspension" indicates a true suspension of the fluorinated polymer granules or pellets into the liquid phase.

When the fluorinated polymer is a liquid at the process temperature, as it is often the case with fluorinated polyethers, the process may be carried out by contacting the starting fluorinated polymer with fluorine and the per(halo)olefin. Alternatively, the liquid fluorinated polymer may be diluted in a suitable solvent.

Typically, the process is carried out in the liquid phase. Suitable solvents include solvents which are inert towards fluorine gas, such as perfluoroalkanes, perfluoropolyethers, perfluoroethers and perfluorotrialkyl amines.

Fluorine may be fed into the reactor as a pure gas or diluted with an inert gas, such as $N_2$, Ar and He.

Typically, fluorine and the (per)haloolefin, in separate feeds, are continuously added to the fluorinated polymer at the given temperature of the process. Generally fluorine is added to the reaction in an amount higher than the stoichiometric amount necessary to convert all the unstable end-groups in the fluorinated polymer to stable end-groups.

The presence of a (per)haloolefin allows carrying out the process according to the invention under mild conditions and with high conversion of the unstable end-groups into stable end-groups.

The expression "(per)haloolefin comprising at least one carbon-carbon double bond and having at least one fluorine or chlorine atom on either one of the carbon atoms of said double bond" is intended to encompass fluoroolefins, chloroolefins, and fluorochloroolefins, these compounds possibly comprising one or more heteroatom different from Cl and F, in particular oxygen. Preferably the (per)haloolefin is a perfluoroolefin.

In one embodiment (per)haloolefins suitable for use in the process are those represented by the following formula:

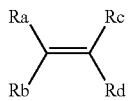

wherein $R_a$, $R_b$, $R_c$ and $R_d$ are each independently selected from the group consisting of —F, —Cl and hydrocarbon groups, possibly comprising one or more chlorine and/or fluorine atoms, optionally having one or more heteroatoms different from —F and —Cl, e.g. oxygen, possibly directly linked to the double bond. At least one of $R_a$, $R_b$, $R_c$ and $R_d$ is selected from fluorine or chlorine.

Preferably, $R_a$, $R_b$, $R_c$ and $R_d$ are each independently selected in the group consisting of —F, —Cl, $C_1$-$C_4$ perfluorocarbon groups, $C_1$-$C_4$ oxygen-containing perfluorocarbon groups, $C_1$-$C_4$ fluorochlorohydrocarbon groups, and $C_1$-$C_4$ oxygen-containing fluorochlorohydrocarbon groups. Still preferably, $R_a$, $R_b$, $R_c$ and $R_d$ are each independently selected in the group consisting of —F, —Cl, $C_1$-$C_2$ perfluorocarbon groups, $C_1$-$C_2$ oxygen-containing perfluorocarbon groups, $C_1$-$C_2$ fluorochlorohydrocarbon groups, and $C_1$-$C_2$ oxygen-containing fluorochlorohydrocarbon groups. Even more preferably at least three of $R_a$, $R_b$, $R_c$ and $R_d$ are selected from —F, —Cl.

As examples of such (per)haloolefins, mention may be made of $C_2$-$C_{18}$ fluoro and/or perfluoroolefins, preferably $C_2$-$C_{10}$ fluoro and/or perfluoroolefins, such as tetrafluoroethylene, hexafluoropropylene and its dimers and trimers, octafluorobutene, perfluoropentene, perfluorohexene, perfluoroheptene, perfluorooctene, perfluorocyclobutene, perfluorocyclopentene, perfluorocyclohexene, chlorotrifluoroethylene, dichlorodifluoroethylene, chloropentafluoropropene, perfluorobutadiene, perfluoromethylvinylether, perfluoroethylvinylether, perfluoropropylvinylether; $CF_3OCCl\!=\!CClF$, trichloroethylene, tetrachloroethylene, dichloroethylene isomers; fluorodioxoles, of formula (I):

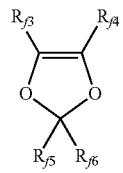

wherein each of $R_{f3}$, $R_{f4}$, $R_{f5}$, $R_{f6}$, equal or different each other, are as defined above.

Preferably the (per)haloolefin is selected from the group consisting of tetrafluoroethylene, hexafluoropropylene and its dimers and trimers. More preferably the (per)haloolefin is selected from the group consisting of tetrafluoroethylene and hexafluoropropylene.

The amount of (per)haloolefin used in the process is not critical. According to one embodiment, the amount of said (per)haloolefin is comprised in the range of 0.1 to 30 mol % with respect to the amount of fluorine fed to the reaction. Preferably, said amount is comprised in the range of 0.5 to 20 mol % with respect to the amount of fluorine fed to the reaction. More preferably, said amount is comprised in the range of 1 to 15 mol % with respect to the amount of fluorine fed to the reaction.

Typically the (per)haloolefin is continuously fed to the reaction system in the required amount during the fluorination reaction.

A hydrogen fluoride scavenger may be used (e.g. NaF, KF).

The process temperature may be advantageously maintained in the range of −100° C. to +100° C.

Advantageously, no temperature increase is required to perform the complete fluorination of the fluorinated polymer.

The end of the reaction can be advantageously detected by online analysis, by checking fluorine conversion, which typically suddenly drops to zero.

At the end of the process the unstable end-groups are converted into stable —$CF_3$ groups.

When the fluorinated polymer is selected among those comprising recurring units derived from at least one ethylenically unsaturated fluorinated monomer, the amount of residual unstable end-groups at the end of the fluorination process is of less than 15 mmol of unstable end-groups per kg of fluorinated polymer, less than 12 mmol/kg, and even less than 10 mmol/kg. At the end of the inventive process fluorinated polymers containing less than 5 mmol of unstable end-groups per kg of fluorinated polymer, less than 3 mmol/kg of fluorinated polymer and even less than 1 mmol/kg of fluorinated polymer may advantageously be obtained.

When the fluorinated polymer is selected among fluorinated polyethers the amount of residual unstable end-groups at the end of the fluorination process is of less than 80 mmol of unstable end-groups per kg of fluorinated polyether, less than 60 mmol/kg, and even less than 50 mmol/kg. At the end of the inventive process fluorinated polymers containing less than 40 mmol of unstable end-groups per kg of fluorinated polyether, less than 30 mmol/kg of fluorinated polyether and even less than 20 mmol of unstable end-groups per kg of fluorinated polyether may advantageously be obtained.

The resulting fluorinated polymers are characterized by an increased thermal and chemical stability.

The invention will be now described in more detail with reference to the following examples, whose purpose is merely illustrative and not intended to limit the scope of the invention. Should the disclosure of any patents, patent applications, and publications which are incorporated herein by reference conflict with the description of the present application to the extent that it may render a term unclear, the present description shall take precedence.

EXAMPLES $^{19}$F-NMR determination of end-groups was carried out according to methods known in the art.

The quantitative FT-IR determination of end-groups was carried out according to the following analytical method.

Frequency was observed in the following range: 1890-1880 cm$^{-1}$ for acyl fluoride end groups, 1820-1770 cm$^{-1}$ for carboxylic acid end-groups. Carboxylic acid end-groups generally show two carbonylic bands: the higher frequency one has been associated with the monomeric form, while the lower frequency one to carboxylic groups forming hydrogen bonded systems. The overall sensitivity of the FT-IR method is in the order of 5*10$^{-5}$ moles/Kg. Samples, in the physical form of powder or film have been analysed with an optical path length in the order of hundreds of microns.

Reference matrixes of fluorinated polymers with no end-groups, to be used as references for spectral subtraction, were identified with the IR method described previously in PIANCA, M., et al. End groups in fluoropolymers. *J. Fluorine Chem.* 1999, vol. 95, p. 71-84.

Experimental details: IR data recorded in Transmission, with a Thermo Nicolet Nexus® FT-IR equipment (256 scans, resolution 2 cm$^{-1}$).

After spectral recording, the spectral subtraction were performed using the corresponding reference matrixes for each polymer; spectral range considered for end-groups evaluation was 2000-1600 cm$^{-1}$ for carbonyl region (3600-3500 cm$^{-1}$ for OH groups of carboxylic acid in monomeric form if necessary). Frequencies and intensities observed in the subtraction spectra were used for quantitative evaluation of the unstable end-groups.

Example 1 and Comparative Example 1

Fluorination of a Fluorinated Polyether Having Mn=4725

The starting fluorinated polymer was a perfluorinated polyether mixture having generic formula FC(O)CF$_2$O(CF$_2$CF$_2$O)$_b$(CF$_2$O)$_a$CF$_2$C(O)F and a number average molecular weight of 4725 g/mol.

In a 500 ml stainless steel reactor 400 g of perfluorinated polyether were loaded and heated at 80° C. while keeping the system under vigorous stirring. At t=0 h fluorine (6.3 Nl/h in 4.0 Nl/h of He) and C$_3$F$_6$ (0.3 Nl/h in 2.0 Nl/h of He) were fed to the reactor through two inlet pipes. During the reaction, small samples of the mixture were taken at regular intervals and analyzed via $^{19}$F-NMR to determine the residual —COF concentration. After 26.5 hours the reaction was stopped and the reaction mixture analyzed. Table 1 reports the —COF concentration as a function of time.

TABLE 1

| Time (h) | —COF concentration (mmol/kg) |
|---|---|
| 0 | 139 |
| 5.5 | 102 |
| 12.5 | 71 |
| 19.5 | 54 |
| 26.5 | 36 |

The same procedure was repeated without the addition of C$_3$F$_6$. Table 2 reports the —COF concentration as a function of time.

TABLE 2

| Time (h) | —COF concentration (mmol/kg) |
|---|---|
| 0 | 139 |
| 7.8 | 122 |
| 16 | 105 |
| 23.9 | 96 |
| 30.4 | 83 |

The comparison of the data in Tables 1 and 2 shows that the presence of C$_3$F$_6$ during the fluorination process unexpectedly increases by 2-fold the efficiency of the unstable end-groups conversion.

Example 2 and Comparative Example 2

Fluorination of a Fluorinated Polyether Having Mn=506

Following the same procedure of Example 1, 140 g of a perfluorinated polyether mixture having generic formula FC(O)CF$_2$O(CF$_2$CF$_2$O)$_b$(CF$_2$O)$_a$CF$_2$C(O)F and a number average molecular weight of 506 g/mol was fluorinated in the presence of C$_3$F$_6$. Fluorine (4.0 Nl/h in 9.0 Nl/h of He) and C$_3$F$_6$ (0.3 Nl/h in 9.0 Nl/h of He) were fed to the reactor held at 20° C. and the residual —COF groups monitored by $^{19}$F-NMR. After 15 hours the reaction was stopped and the reaction mixture analyzed. Table 3 reports the —COF concentration as a function of time.

TABLE 3

| Time (h) | —COF concentration (mmol/kg) |
|---|---|
| 0 | 3509 |
| 7 | 754 |
| 15 | 22 |

After 15 hours 99.4% of the unstable —COF groups were converted to neutral, stable end-groups The same procedure described in Example 2 was repeated without the addition of C$_3$F$_6$. After 15 hours the —COF conversion to neutral end-groups was below 5%.

Examples 3 and 4

Fluorination of a Fluorinated Polyether Having Mn=506 in the Presence of C$_2$F$_4$ or C$_2$F$_3$Cl Following the same procedure of Example 2, 147 g of the perfluorinated polyether mixture having generic formula FC(O)CF$_2$O(CF$_2$CF$_2$O)$_b$(CF$_2$O)$_a$CF$_2$C(O)F and an average molecular weight of 506 g/mol was fluorinated in the presence of C$_2$F$_4$ or C$_2$F$_3$Cl. Fluorine (4.0 Nl/h in 9.0 Nl/h of He) and C$_2$F$_4$ or C$_2$F$_3$Cl (0.3 Nl/h in 9.0 Nl/h of He) were fed to the reactor held at 20° C. and the residual —COF groups monitored by $^{19}$F-NMR. After 15 hours the reaction was stopped and the reaction mixture analyzed. Table 4 reports the —COF concentration as a function of time.

TABLE 4

| Time (h) | —COF concentration (mmol/kg) | |
|---|---|---|
| | Example 3 $C_2F_4$ | Example 4 $C_2F_3Cl$ |
| 0 | 3509 | 3509 |
| 7 | 880 | 852 |
| 15 | 53 | 35 |

After 15 hours 98.5% (Example 3) and 99.0% (Example 4) of the unstable —COF groups were converted to neutral, stable end-groups.

Example 5 and Comparative Example 3

Fluorination of a tetrafluoroethylene/2,2,4-trifluoro-5-trifluoromethoxy-1,3-dioxole copolymer A solution of 20 g of a tetrafluoroethylene/2,2,4-trifluoro-5-trifluoromethoxy-1,3-dioxole copolymer in a 60/40 molar ratio (commercially available under the trade name of Hyflon® AD 40, Solvay Solexis SpA) in perfluorinated polyether solvent (Perfluoropolyether Galden® LS165, Solvay Solexis SpA) was fluorinated in a stirred PFA flask at 20° C. Fluorine (1.8 NI/h in 5.4 NI/h of He) and $C_3F_6$ (0.3 NI/h in 0.9 NI/h of He) were separately fed into the stirred solution. After 10 h and 20 h of fluorination two samples were taken, solvent was evaporated and the dry polymer was characterized via FT-IR according to the method described above to verify the presence of end-groups. After 20 h no residual unstable end-groups were detected. Table 5 shows the concentration of unstable end-groups as a function of time of fluorination in terms of mmol/kg.

TABLE 5

| t (hours) | Rf—COOH (1814 cm$^{-1}$) (mmol/kg) | Rf—COOH (1776 cm$^{-1}$) (mmol/kg) | Rf—COF (1884 cm$^{-1}$) (mmol/kg) |
|---|---|---|---|
| 0 | 3.5 | 1.2 | 0.0 |
| 10 | 0.0 | 0.0 | 0.5 |
| 20 | 0.0 | 0.0 | 0.0 |

The same procedure was repeated without the addition of $C_3F_6$. After 20 hours the reaction was stopped and the content of unstable end-groups analysed by FT-IR. The results reported in Table 6 show that residual unstable end-groups are still present in the fluorinated polymer even after 20 hours of reaction.

TABLE 6

| t (hours) | Rf—COOH (1814 cm$^{-1}$) (mmol/kg) | Rf—COOH (1776 cm$^{-1}$) (mmol/kg) | Rf—COF (1884 cm$^{-1}$) (mmol/kg) |
|---|---|---|---|
| 0 | 3.5 | 1.2 | 0.0 |
| 20 | 0.0 | 0.0 | 0.9 |

Example 6

Fluorination of tetrafluoroethylene/$CF_2$=$CFOCF_2CF_2SO_2F$ Copolymer

A solution of 7.5 g of a tetrafluoroethylene/$CF_2$=$CFOCF_2CF_2SO_2F$ copolymer having an equivalent weight of 550 g/eq in perfluoroeptane was fluorinated in a stirred PFA flask at 0° C. Fluorine (1.8 NI/h in 5.4 NI/h of He) and $C_3F_6$ (0.3 NI/h in 0.9 NI/h of He) were separately fed into the stirred solution. After 6 h the solvent was evaporated and the dry polymer was characterized via FT-IR. Table 7 shows the concentration of residual unstable end-groups as a function of time in terms of mmol/kg. After 6 hours all the unstable end-groups have been converted.

TABLE 7

| t (hours) | Rf—COOH (1814 cm$^{-1}$) (mmol/kg) | Rf—COOH (1776 cm$^{-1}$) (mmol/kg) | Rf—COF (1884 cm$^{-1}$) (mmol/kg) |
|---|---|---|---|
| 0 | 3.9 | 2.7 | 0.0 |
| 6 | 0.0 | 0.0 | 0.0 |

Possible modifications and/or additions may be made by those skilled in the art to the hereinabove disclosed and illustrated embodiment while remaining within the scope of the following claims.

The invention claimed is:

1. A process for reducing the amount of unstable end-groups in a fluorinated polymer, the process comprising reacting a fluorinated polymer comprising unstable end-groups with fluorine in the presence of at least one (per) haloolefin comprising at least one carbon-carbon double bond and having at least one fluorine or chlorine atom on either one of the carbon atoms of said double bond.

2. Process according to claim 1 wherein the unstable end-groups are selected from end groups comprising a —C(O)— functional group.

3. Process according to claim 1 wherein the fluorinated polymer is selected from polymers comprising recurring units derived from at least one ethylenically unsaturated fluorinated monomer selected from the group consisting of:

$C_2$-$C_8$ perfluoroolefins; chloro- and/or bromo- and/or iodo- $C_2$-$C_6$ fluoroolefins;

fluoroalkylvinylethers of formula $CF_2$=$CFOR_{f1}$ in which $R_{f1}$ is a $C_1$-$C_6$ perfluoroalkyl;

fluoro-oxyalkylvinylethers of formula $CF_2$=$CFOX_1$, in which $X_1$ is a $C_1$-$C_{12}$ fluoroxyalkyl, or a $C_1$-$C_{12}$ perfluorooxyalkyl having one or more ether groups;

fluoroalkyl-methoxy-vinylethers of formula $CF_2$=$CFOCF_2OR_{f2}$ in which $R_{f2}$ is a $C_1$-$C_6$ fluoro- or perfluoroalkyl or a $C_1$-$C_6$ perfluorooxyalkyl having one or more ether groups;

functional fluoro-alkylvinylethers of formula $CF_2$=$CFOY_0$, in which $Y_0$ is a $C_1$-$C_{12}$ fluoroalkyl or perfluoroalkyl, or a $C_1$-$C_{12}$ fluoroxyalkyl, or a $C_1$-$C_{12}$ perfluorooxyalkyl, said $Y_0$ group having one or more ether groups and $Y_0$ comprising a carboxylic or sulfonic acid group, in its acid, acid halide or salt form;

fluorodioxoles, of formula (I):

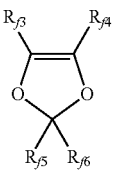

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom.

4. Process according to claim 3 wherein the fluorinated polymer is selected from the group consisting of
polymers comprising recurring units derived from tetrafluoroethylene and recurring units derived from at least one other monomer selected from the group consisting of hexafluoropropylene and/or perfluoro(alkyl vinyl ether) wherein the perfluoroalkyl group of the perfluoro(alkyl vinyl ether) is linear or branched and contains 1 to 5 carbon atoms;
polymers comprising recurring units derived from tetrafluoroethylene or chlorotrifluoroethylene and recurring units derived from fluorodioxoles of formula (I);
polymers comprising recurring units derived from tetrafluoroethylene and/or chlorotrifluoroethylene and recurring units derived from at least one functional monomer of formula $CF_2=CF-O-(CF_2CF(CF_3)O)_m-(CF_2)_nSO_2F$ and its acid or salt form wherein m is an integer equal to 0 or 1, and n is an integer from 0 to 10.

5. Process according to claim 1 wherein the fluorinated polymer is selected form fluorinated polyethers comprising at least one recurring unit selected from the group consisting of:
—CFXO—;
—$CF_2$CFXO—;
—CFXCF$_2$O—;
—$CF_2CF_2CF_2O$—;
—$CF_2CF_2CF_2CF_2O$—; and
—$(CF_2)_k$—CFZ—O—,
wherein k is an integer from 0 to 3 and Z is a group of general formula —$OR_FT_3$,
wherein $R_F$ is a fluoropolyoxyalkylene chain comprising a number of recurring units from 0 to 10, said recurring units being chosen from the group consisting of: —CFXO—, —$CF_2$CFXO—, —$CF_2CF_2CF_2O$—, —$CF_2CF_2CF_2CF_2O$—, wherein $T_3$ is a $C_1$-$O_5$ perfluoroalkyl group and wherein each of X is independently —F or —$CF_3$.

6. Process according to claim 5 wherein the fluorinated polymer is selected from the fluorinated polyethers comprising units selected from the group consisting of:
—$(CF_2O)_a$—$(CF_2CF_2O)_b$—$(CF_2-(CF_2)_d$—$CF_2O)_c$,
wherein a, b and c are integers up to 100, and d is independently at each occurrence an integer equal to 1 or 2; $a \geq 0$, $b \geq 0$, $c \geq 0$ and a+b>0;
—$(C_3F_6O)_e$—$(CF_2CF_2O)_b$—$(CFXO)_g$—, wherein X is, at each occurrence, independently selected among —F and —$CF_3$; b, e and g are integers up to 100, e>0, $b \geq 0$, $g \geq 0$; and
—$(C_3F_6O)_e$—$(CFXO)_g$—, wherein X is, at each occurrence, independently selected among —F and —$CF_3$; e and g are integers up to 100, e>0, $g \geq 0$.

7. Process according to claim 1 wherein the (per)haloolefin complies with the following formula:

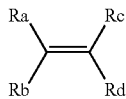

wherein $R_a$, $R_b$, $R_c$ and $R_d$ are each independently selected in the group consisting of F, Cl and hydrocarbon groups, wherein the hydrocarbon group optionally comprises one or more chlorine and/or fluorine atoms, and optionally includes one or more heteroatoms different from fluorine and chlorine, optionally directly linked to the double bond.

8. Process according to claim 7, wherein $R_a$, $R_b$, $R_c$ and $R_d$ are each independently selected from the group consisting of —F, —Cl, $C_1$-$C_4$ perfluorocarbon groups, $C_1$-$C_4$ oxygen-containing perfluorocarbon groups, $C_1$-$C_4$ fluorochlorohydrocarbon groups, and $C_1$-$C_4$ oxygen-containing fluorochlorohydrocarbon groups.

9. Process according to claim 1 wherein the (per)haloolefin is selected from the group consisting of: tetrafluoroethylene, hexafluoropropylene and its dimers and trimers, octafluorobutene, perfluoropentene, perfluorohexene, perfluoroheptene, perfluorooctene, perfluorocyclobutene, perfluorocyclopentene, perfluorocyclohexene, chlorotrifluoroethylene, dichlorodifluoroethylene, chloropentafluoropropene, perfluorobutadiene, perfluoromethylvinylether, perfluoroethylvinylether, perfluoropropylvinylether; $CF_3OCCl=CClF$, trichloroethylene, tetrachloroethylene; and fluorodioxoles of formula (I).

10. Process according to claim 1 wherein the amount of said (per)haloolefin is in the range of 0.1 to 30% moles with respect to the amount of fluorine.

11. Process according to claim 3 comprising reducing the amount of unstable end-groups in the fluorinated polymer to less than 5 mmol of unstable end-groups per kg of fluorinated polymer.

12. Process according to claim 5 comprising reducing the amount of unstable end-groups in the fluorinated polymer to less than 80 mmol of unstable end-groups per kg of fluorinated polymer.

13. Process according to claim 1 carried out in the liquid phase.

14. Process according to claim 4 comprising reducing the amount of unstable end-groups in the fluorinated polymer to less than 5 mmol of unstable end-groups per kg of fluorinated polymer.

15. Process according to claim 6 comprising reducing the amount of unstable end-groups in the fluorinated polymer to less than 80 mmol of unstable end-groups per kg of fluorinated polymer.

16. Process according to claim 6 wherein the fluorinated polymer is selected from the fluorinated polyethers comprising units selected from the group consisting of:
—$(CF_2O)_a$—$(CF_2CF_2O)_b$—$(CF_2-(CF_2)_d$—$CF_2O)_c$,
wherein a, b and c are integers up to 50; d is independently at each occurrence an integer equal to 1 or 2; a>0, b>0, $c \geq 0$, and b/a is between 0.1 and 10;
—$(C_3F_6O)_e$—$(CF_2CF_2O)_b$—$(CFXO)_g$—
wherein X is, at each occurrence, independently selected from —F and —$CF_3$; b, e and g are integers up to 100; e>0, b>0, g>0, e/b is between 0.2 and 5.0, and (e+b)/g is between 5 and 50; and
—$(C_3F_6O)_e$—$(CFXO)_g$—, wherein X is, at each occurrence, independently selected from —F and —$CF_3$; e and g are integers up to 100; e>0, g>0, and e/g is between 5 and 50.

* * * * *